US006979010B1

(12) United States Patent
Kwapis

(10) Patent No.: US 6,979,010 B1
(45) Date of Patent: Dec. 27, 2005

(54) SPORT UTILITY WHEELCHAIR

(76) Inventor: Randal J. Kwapis, 1896 Redpine Dr., Gaylord, MI (US) 49735

(*) Notice: Subject to any disclaimer, the term of this patent is extended or adjusted under 35 U.S.C. 154(b) by 0 days.

(21) Appl. No.: 10/858,345

(22) Filed: Jun. 1, 2004

(51) Int. Cl.[7] .............................................. B62M 1/14
(52) U.S. Cl. ................. 280/250.1; 280/42; 297/DIG. 4
(58) Field of Search .......................... 280/250.1, 304.1, 280/DIG. 4, 325, 326, 327, 42, 638; 297/DIG. 4, 297/325, 326, 327

(56) References Cited

U.S. PATENT DOCUMENTS 5,004,259 A * 4/1991 Ayers et al. ............. 280/304.1
5,480,172 A * 1/1996 James ..................... 280/250.1
5,718,442 A * 2/1998 Alexander et al. ....... 280/250.1
5,727,802 A * 3/1998 Garven et al. ........... 280/250.1
5,957,474 A * 9/1999 Mundy et al. ........... 280/304.1
6,168,178 B1 * 1/2001 Garven et al. ........... 280/250.1
6,352,275 B1 * 3/2002 Lindenkamp ............ 280/250.1
6,428,029 B1 * 8/2002 Barclay ................... 280/250.1
6,447,064 B1 * 9/2002 Mundy et al. .............. 297/313
6,547,206 B1 * 4/2003 Dickie ........................ 248/575

* cited by examiner

*Primary Examiner*—Kevin Hurley
(74) *Attorney, Agent, or Firm*—Northern Michigan Patent Law, PLC

(57) ABSTRACT

A sports wheelchair also suitable for everyday use has a low, stable, planar frame and a shock-absorbing two strut suspension that places the center of gravity of the chair and user forward of the main wheel axis. The suspension supports a planar seat assembly with both lateral seat-width and longitudinal center-of-gravity adjustments. The forward end of the frame extends a significant distance beyond the forward edge of the main wheels to mount caster-type front wheels and a large, stable transfer plate.

20 Claims, 12 Drawing Sheets

SPORT UTILITY WHEELCHAIR

FIELD OF THE INVENTION

The present invention is in the field of wheelchairs.

BACKGROUND OF THE INVENTION

Wheelchair users are increasingly using their wheelchairs in more active ways, for example outdoors on unpaved terrain, and in wheelchair-oriented sports and competitions. Wheelchair design, however, generally seems to be divided between cumbersome institutional models and lightweight collapsible travel models, neither of which is particularly well suited for the more active outdoor and sport user. Heavier-built wheelchairs tend to be less useful for active use. Lightweight, adjustable wheelchairs tend not to be suitable for strenuous or everyday use.

Some of the drawbacks with existing wheelchairs that become more pronounced with sports use include poor balance and wheelbase stability; frames unsuitable for rough use, both as to frame durability and user comfort; insufficient adjustability for different activities; and difficult "transfer" of the user on and off the wheelchair with the user relying on the wheelchair for support.

BRIEF SUMMARY OF THE INVENTION

The present invention is a manual wheelchair designed to excel in sporting and outdoor activities, yet remain suitable for everyday use. The wheelchair achieves this with a low, forward-extended frame and front wheel support; a two-point seat suspension with an angled, vertically-adjustable front monoshock strut and an angled, vertically-adjustable rear pivot strut; a rail-type seat assembly with positive width and fore-aft adjustments; and an extended transfer plate on the forward part of the frame.

The wheelchair frame is a low, stable, preferably planar frame with the drive wheels and rear seat support mounted to the rear end of the frame, the front monoshock strut mounted to a middle portion of the frame, and the front secondary or caster-type wheels mounted to the front end of the frame spaced from the forward edge of the drive wheels. In a preferred form the frame is tubular, with two spaced longitudinal bars, a rear cross-member, middle cross-member, and front cross-member. The frame is preferably downwardly angled from rear to front between the drive wheel axis and the front wheels.

The two-point support between the frame and seat assembly is located over the rear half of the frame, forward of the main wheel axis, with the upper ends of the struts connected by a rigid connector member or block to define a vertical plane bisecting the rear portion of the frame. The rigid connector member or block in a preferred form is a planar half-moon "monoblock" defining an arcuate path of adjustment points. The lower ends of the front and rear strut supports are secured to the frame in vertically adjustable fashion. The seat support assembly accordingly forms a generally trapezoidal planar support with an angled rear pivot connection and an angled front shock-absorbing connection to the frame.

The seat assembly is mounted on the monoblock, in a preferred form with a main crossbar portion of the seat assembly passing through the monoblock. Parallel, free-ended seat support rails are adjustably mounted on the ends of the main crossbar, such that the seat assembly has a generally H-shaped appearance centered on the monoblock.

The seat support rails are laterally adjustable in sliding fashion on the crossbar to adjust their spacing, and longitudinally adjustable to alter the wheelchair's center of gravity. Upright backrest supports can be adjustably mounted on the rear ends of the seat assembly rails.

Transfer support for the person using the wheelchair is provided by a transfer plate located in the plane of the forward portion of the wheelchair frame, in a preferred form being mounted between the middle frame cross-member and the front frame cross-member, and in a further preferred form extending rearwardly under the seat assembly.

These and other features and advantages of the invention will become apparent upon further reading of the specification, in light of the accompanying drawings.

DETAILED DESCRIPTION OF THE INVENTION

Figure 1:
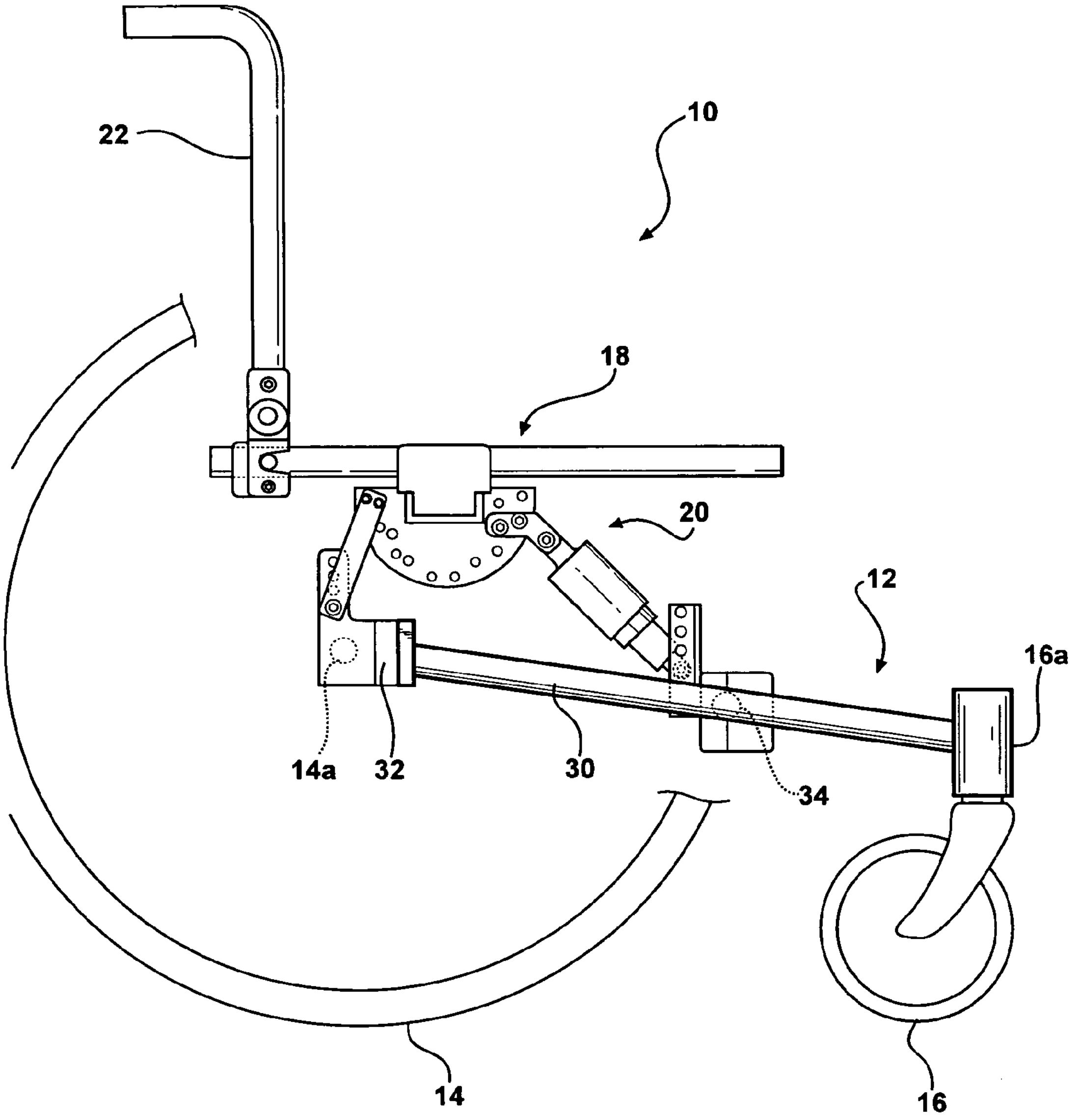
FIG. 1 is a side elevation view of a preferred embodiment of a wheelchair according to the invention.
Figure 2:
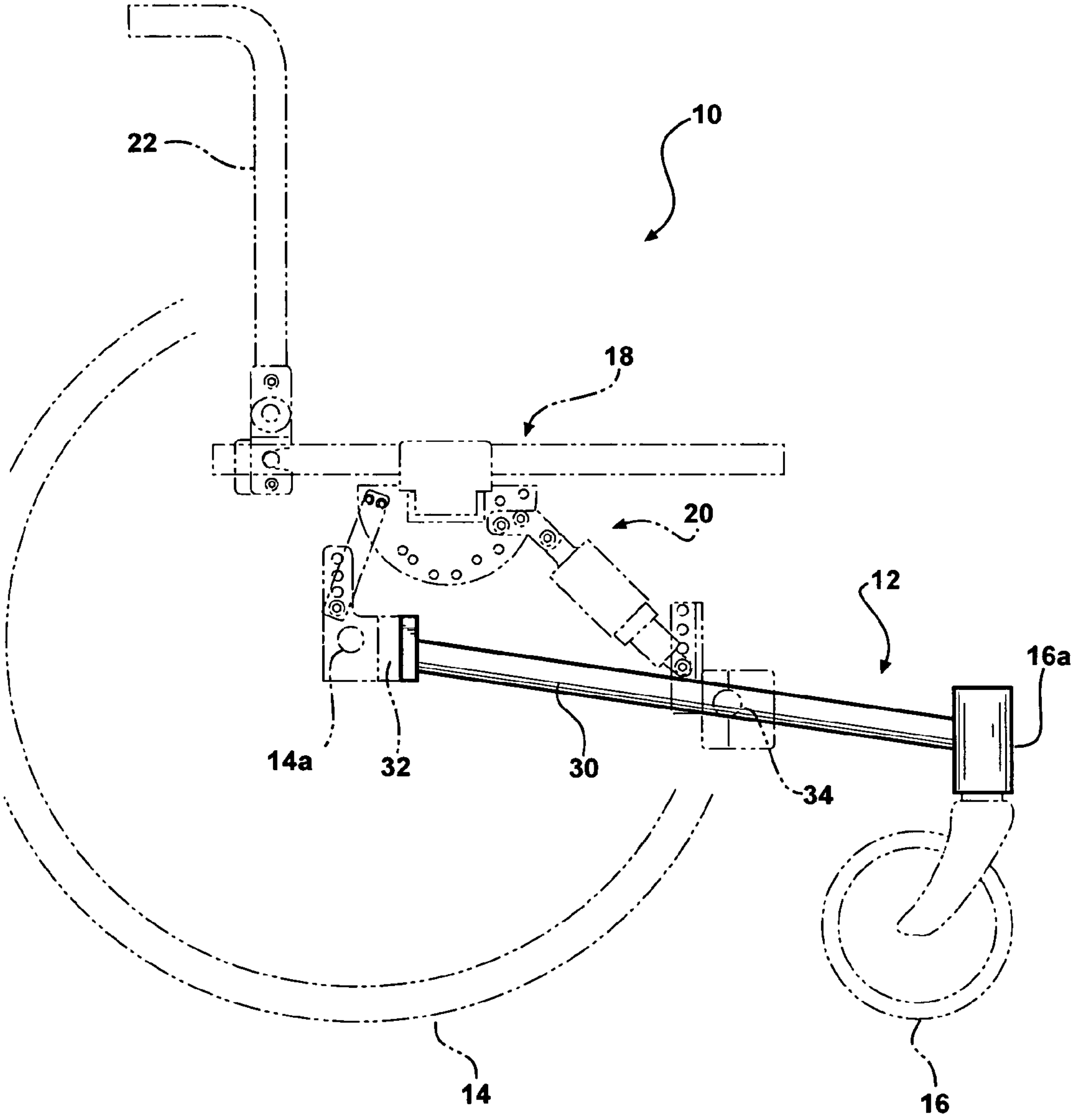
FIG. 2 is similar to FIG. 1, but with the frame in solid lines and the remainder in phantom for clarity.
Figure 2A:
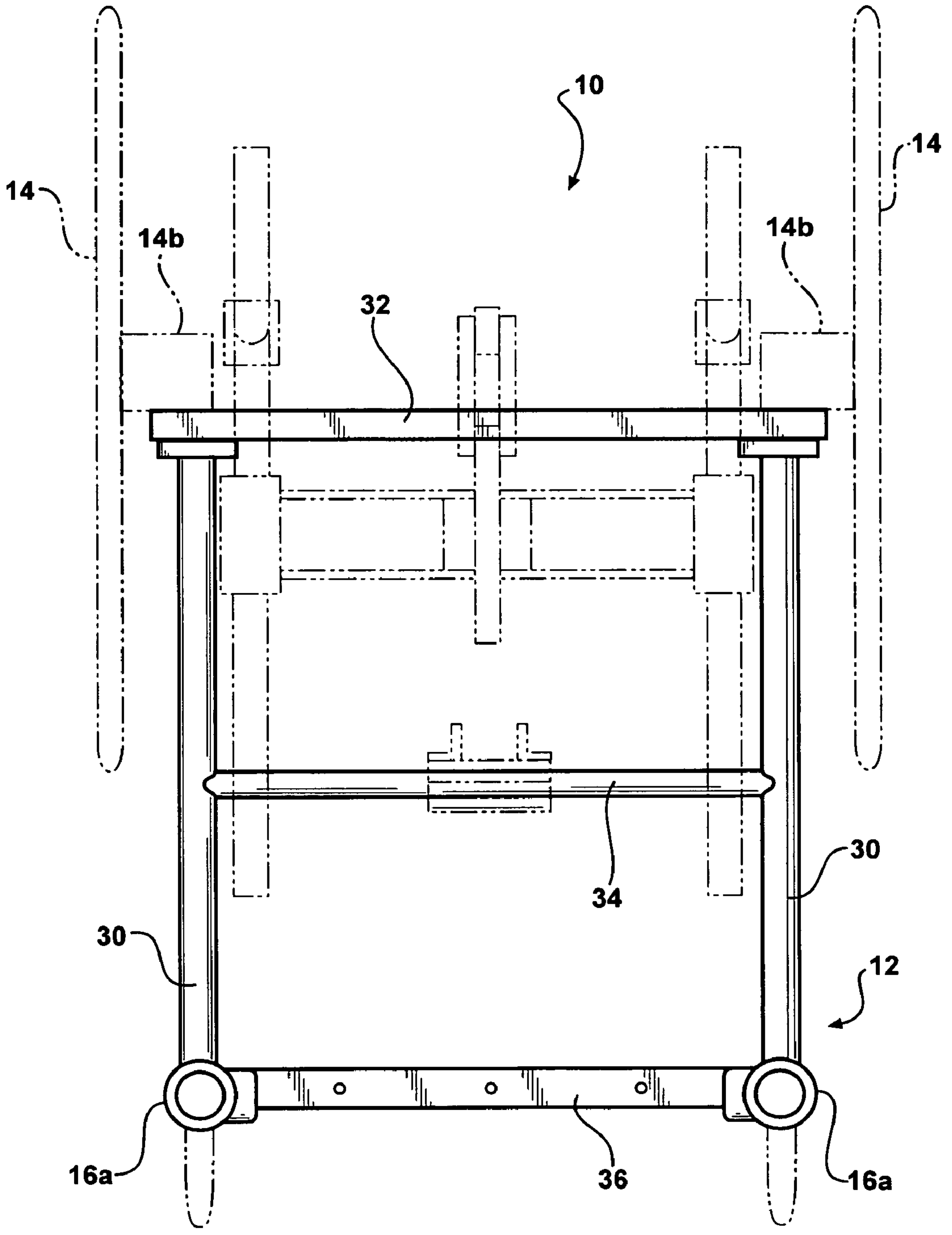
FIG. 2A is a plan view of the wheelchair of FIG. 1, with the frame in solid lines and the remainder in phantom.
Figure 2B:
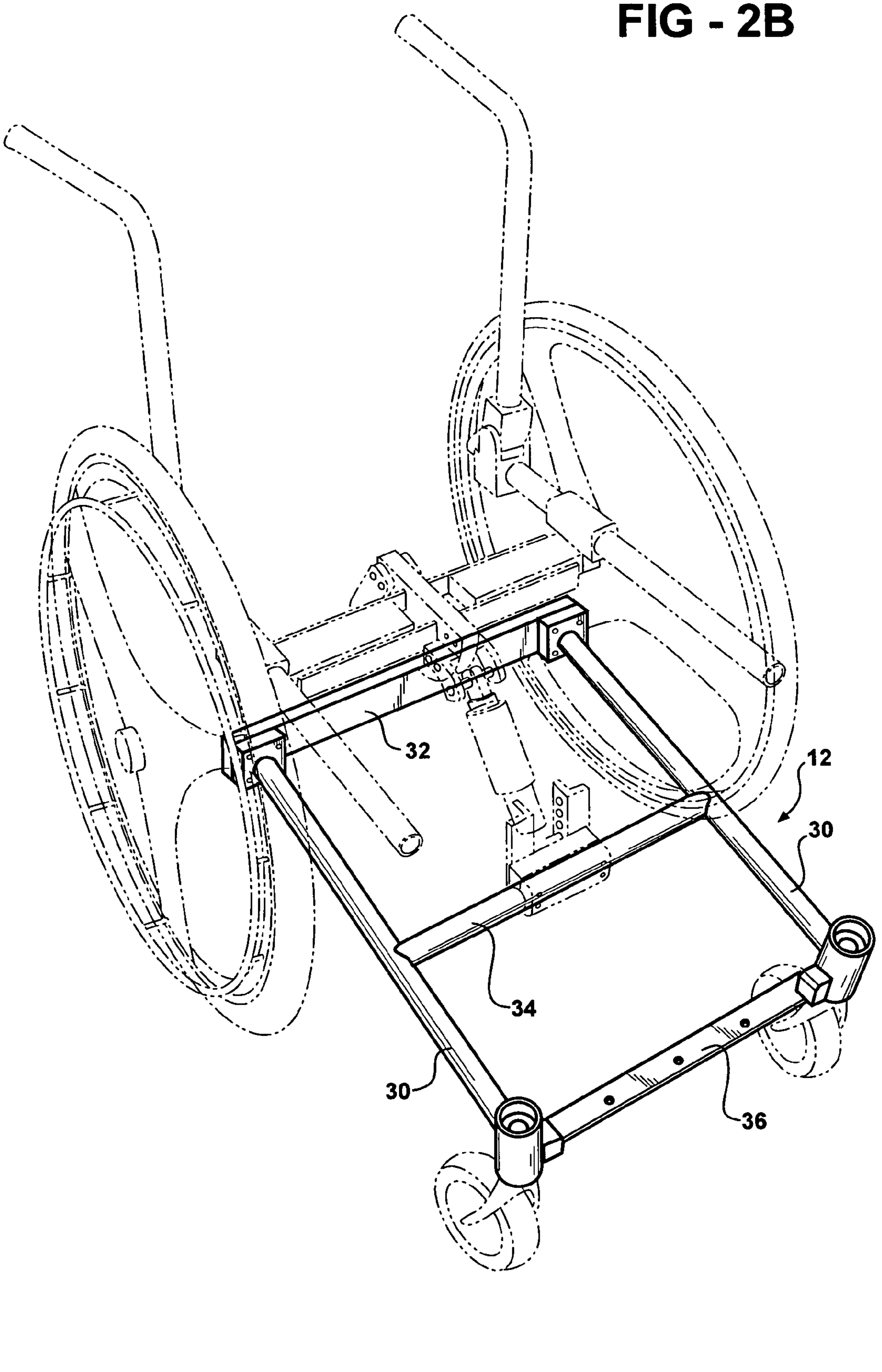
FIG. 2B is a perspective view of the wheelchair of FIG. 1, with the frame in solid lines and the remainder in phantom.
Figure 3:
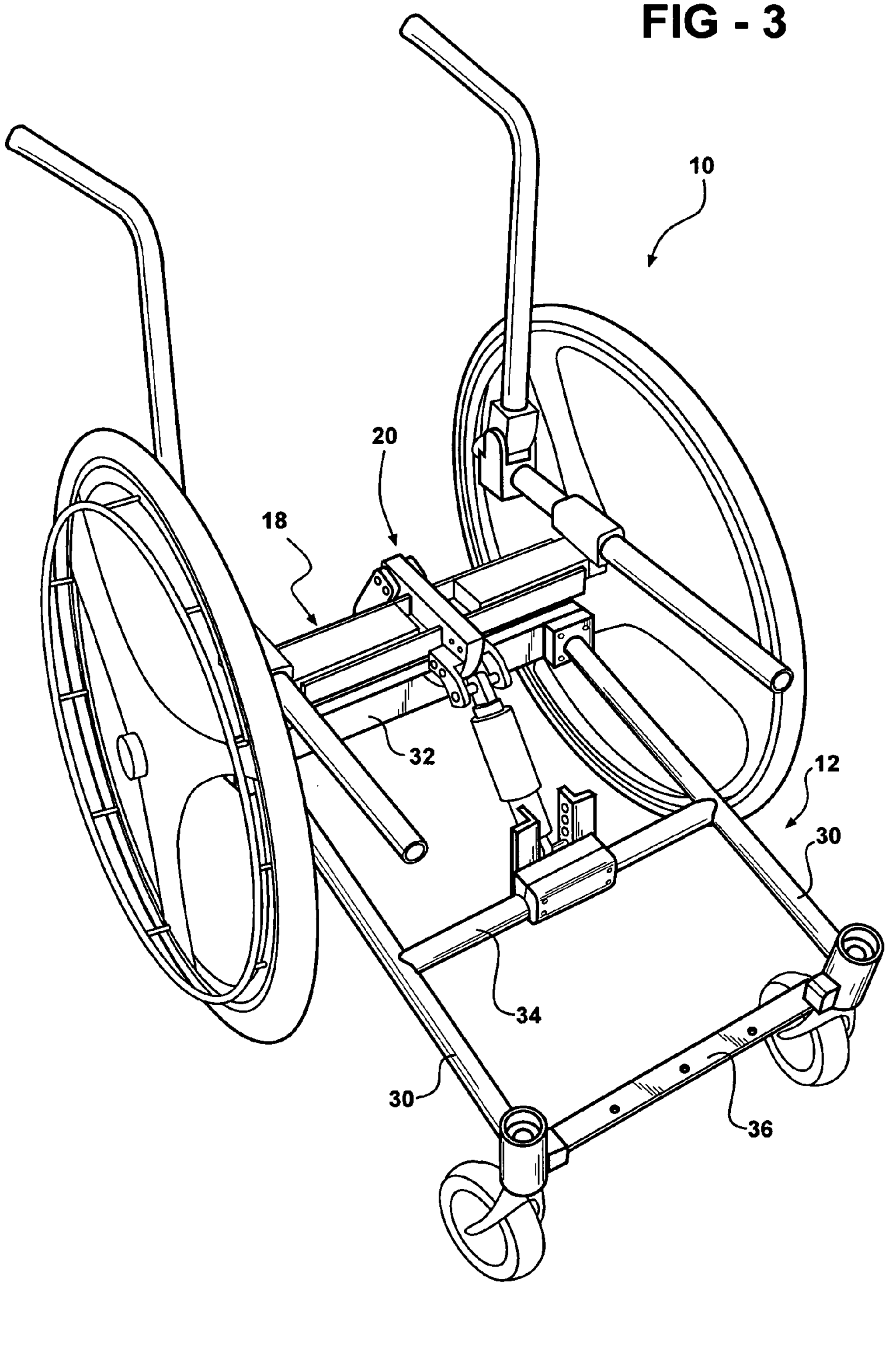
FIG. 3 is a perspective view of the wheelchair of claim 1, all in solid lines.

Referring first to FIGS. 1 through 3, the invention is illustrated in a preferred example in which wheelchair 10 has a frame 12, drive wheels 14, front wheels 16, seat assembly 18, seat suspension assembly 20, and backrest supports 22. Frame 12 is illustrated in solid lines throughout FIGS. 1–3, while for clarity of explanation of frame 12 the remainder of wheelchair 10 is shown in phantom lines in FIGS. 2, 2A, and 2B. Features such as brakes and operating levers, fabric seat and backrest members, and other well known, non-structural features and options are generally omitted from the drawings for clarity.

Frame 12 is an essentially planar frame, mounted low to the ground and with a preferred downward angle θ from horizontal resulting from the difference in size between the main wheels 14 and front wheels 16, sloping downwardly from the rear of the wheel chair to the front. In the illustrated embodiment, angle θ is a currently preferred angle of approximately 8°, but the angle can vary depending on the height of the front wheels and could be 0° (horizontal). Seat assembly 18 is shown mounted in a nominal and preferred horizontal orientation that can subsequently be adjusted through suspension assembly 20.

Frame 12 is preferably made from spaced members such as metal bars and/or tubing, in the illustrated embodiment from a strong aluminum alloy such as Al 6061, T6 temper. It will be understood that other alloys of aluminum, other metals such as steel or titanium, and even non-metals such as plastics and fiber-reinforced composites could be used, although aluminum is highly preferred for its combination of low weight, strength, and reasonable cost. It will also be understood that the constituent parts of frame 12 can be machined separately and joined by known methods such as bolting or welding, or can be formed as a single piece, for example using known casting and machining methods. It will also be understood that although a tube- or spaced-member frame is preferred, frames made from solid plates, perforated decking, and other essentially planar structures are possible.

Illustrated frame 12 has two parallel longitudinal side rails 30 made from hollow tubing, rails 30 being connected by rear cross-member 32, middle cross-member 34, and front cross-member 36. Rear cross-member 32 is the thickest, strongest, and heaviest of the three cross-members, shown as a preferred rectangular beam or bar. Middle cross-member 34 is the next heaviest, shown as a tubular member similar to side rails 30. Front cross-member 36 is the lightest of the three, shown as a thin, flat bar. The relative sizing of the three cross-members weights the frame toward the rear portion of the frame, forward of the drive wheel axis, and the greater mass of the rear and middle cross-members provides area and strength for mounting a seat-supporting suspension as described below.

Frame 12 is described as planar since its main structural members (rails 30, cross-members 32, 34, 36) define a relatively flat, even structural base for the suspension and seat assemblies. The term planar should be understood to include frame shapes whose primary structure-supporting portions or points for wheels and seat suspension can be considered to lie in a plane.

Drive wheels 14 may be mounted on a single axle extending through or connected to rear cross-member 32, or on separate axles connected to rear cross-member 32 rearwardly of the cross-member as illustrated at 14*b* (FIG. 2A). The axis 14*a* of drive wheels 14 is therefore located at the rear of the frame, behind the center of gravity and main loading of the wheelchair through suspension assembly 20. Front caster-type wheels 16 are shown mounted on vertical swivel posts below frame 12, rotatably secured in vertical bearing housings 16*a* of known type located at the forward ends of side rails 30.

Rear and middle cross-members 32 and 34 are connected to the frame in the plane of side rails 30. Front cross-member 36 is preferably offset below middle cross-member 34 to optionally support at least the front end of a transfer plate 90 (FIG. 9) at a downward angle relative to the rear end of the transfer plate attached to middle cross-member 34. Front cross-member 36 is shown provided with a series of holes which allow the transfer plate to be directly connected, for example with matching bolts or studs, or to allow a height-adjustment block or bar to be secured between the front cross-member and transfer plate to adjust the height and angle of the forward end of the transfer plate.

The axis 14*a* of drive wheels 14 is preferably located through or on the rear side or face of rear cross-member 32, in the illustrated embodiment the axle or axles (not shown) being rotatably mounted to the rear face of cross-member 32 with suitable axle supports 14*b*. Middle cross-member 34 is preferably located adjacent or forwardly of the forward edges of drive wheels 14, in the illustrated embodiment approximately even with the forward edges of the drive wheels.

Figure 4:
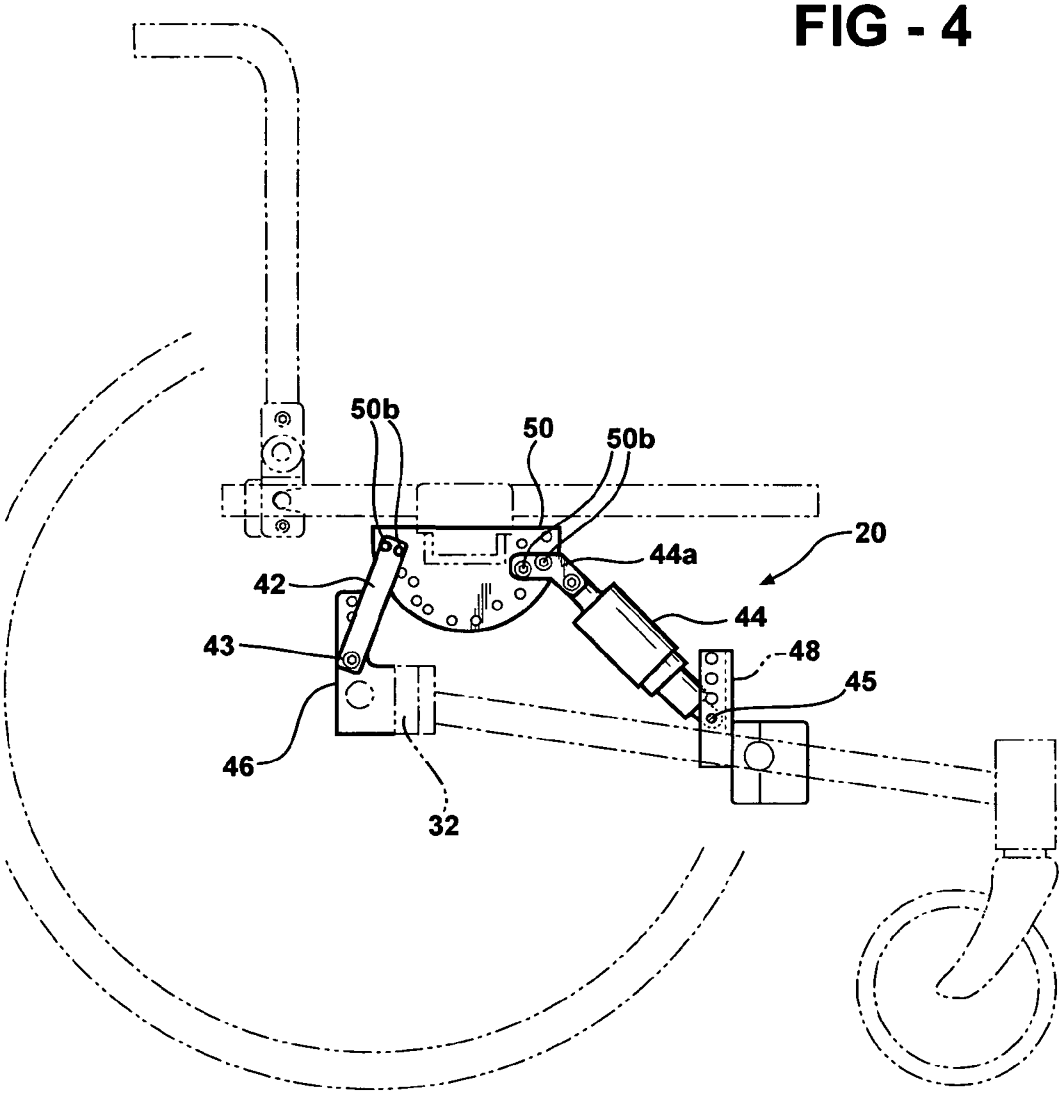
FIG. 4 is a side elevation view of the wheelchair of FIG. 1, with the seat suspension assembly in solid lines and the remainder in phantom.
Figure 5:
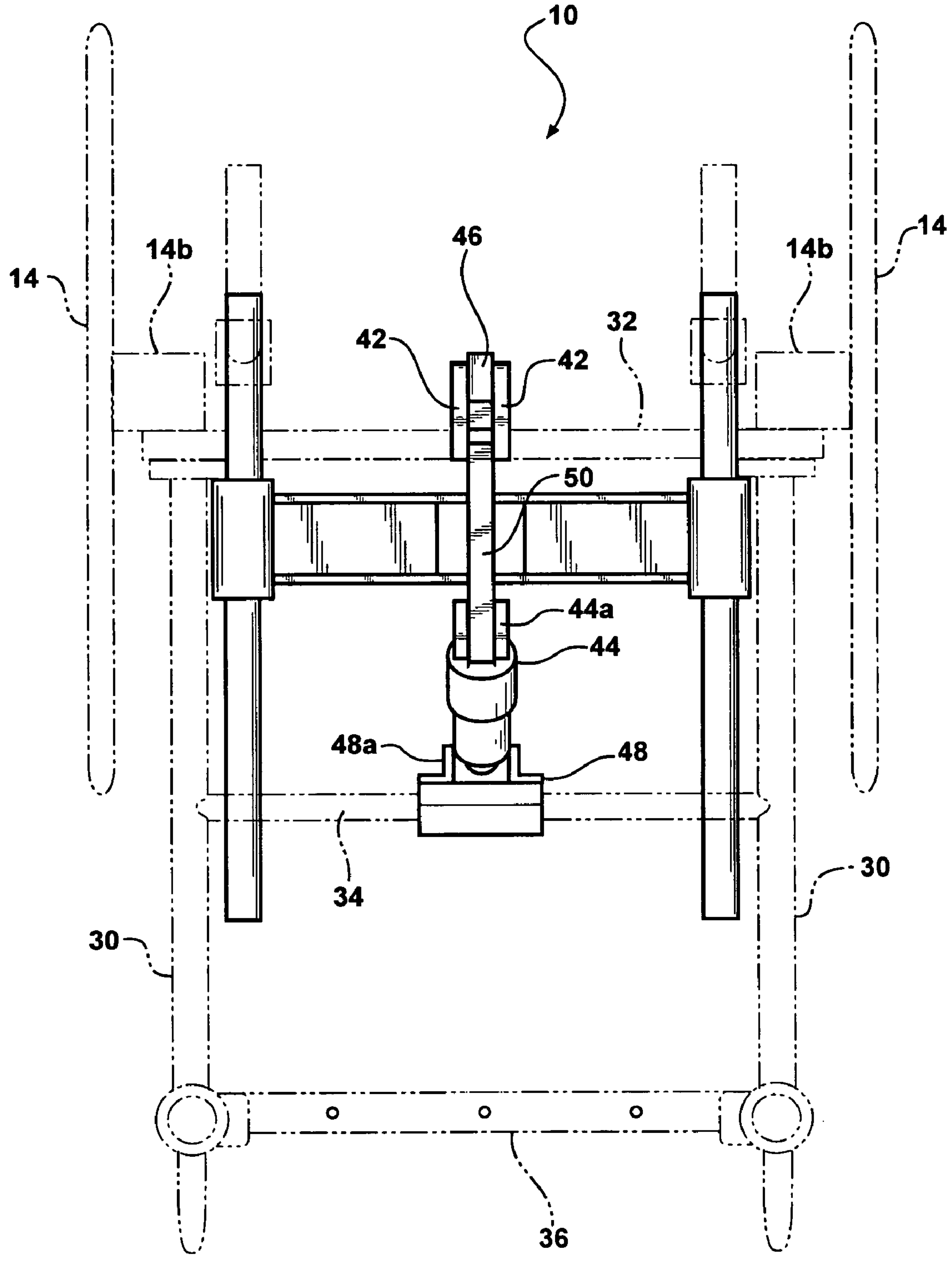
FIG. 5 is a plan view similar to FIG. 2, but with the seat and seat suspension assemblies in solid lines and the remainder in phantom.

Referring next to FIGS. 4 through 5, the seat suspension assembly 20 is a two-point structure with an angled rear strut 42 and a front shock-absorbing strut 44. Rear strut assembly 42 is mounted to the rear frame cross-member 32, and front strut assembly 44 is mounted to the middle frame cross-member 34, in the illustrated embodiment via supports 46 and 48 which allow the connections to be adjusted vertically. In the illustrated embodiment, the rear strut assembly 42 is a split assembly (best shown in FIG. 5) with two identical arms 42 connected to opposite sides of support bar 46, in the illustrated embodiment via a pivot pin or bushing 43 extending through the lower ends of spaced arms 42 and through one of several vertically-spaced holes 46*a* in support bar 46. Front shock-absorbing strut assembly 44 likewise has a vertically-adjustable pivot connection to the frame, in the illustrated embodiment via a pivot pin or bushing 45 extending through lower ear 44*a* on the strut and through aligned holes 48*a* in the spaced plates 48*b* of strut support 48 extending vertically from the center of middle cross-member 34.

Seat suspension assembly 20 further includes a rigid connecting block 50 connecting the upper ends of rear and front struts 42, 44 to the wheelchair seat assembly. Connecting block 50 in the illustrated embodiment is a one-piece, flat-sided, longitudinally-oriented "monoblock" of machined aluminum, shown in a preferred semi-circular shape, with connector points for the upper ends of struts 42, 44 defined around its circumference by pairs of mounting holes 50*a*. The upper end of rear strut 42 is fixed to monoblock 50 by a pair of bolts or pins 50*b* extending through a corresponding pair of holes 50*a*, while the upper end of front strut 44 is fixed to monoblock 50 by a similar pair of bolts or pins 50*b* through a pair of upper link arms 44*a*. Link arms 44*a* in the illustrated embodiment are a preferred dogleg shape with a horizontal portion connected to the monoblock 50 and an angled portion aligned with the axis of the shock absorber.

It will be understood by those skilled in the art that the term "monoblock" is chosen for convenience to refer to the rigid connecting and force-transferring structure which fixes the upper ends of the seat support struts 42, 44, and which transfers force to and from the struts relative to the seat assembly. Other shapes and structures are possible, although the illustrated one-piece, semi-circular monoblock 50 is preferred.

It will also be understood that most or all of the components of suspension 20 are preferably made of light but strong metal such as aluminum, for example the same alloy used for frame 12.

Closer reference to block 50 shows that while the lowermost set of mounting holes 50*a* is horizontal, the mounting hole sets 50*a* extending up and around the circumference of the block are set at an acute angle to horizontal, preferably corresponding to the angle at which struts 42 and 44 extend from the frame.

Figure 4A:
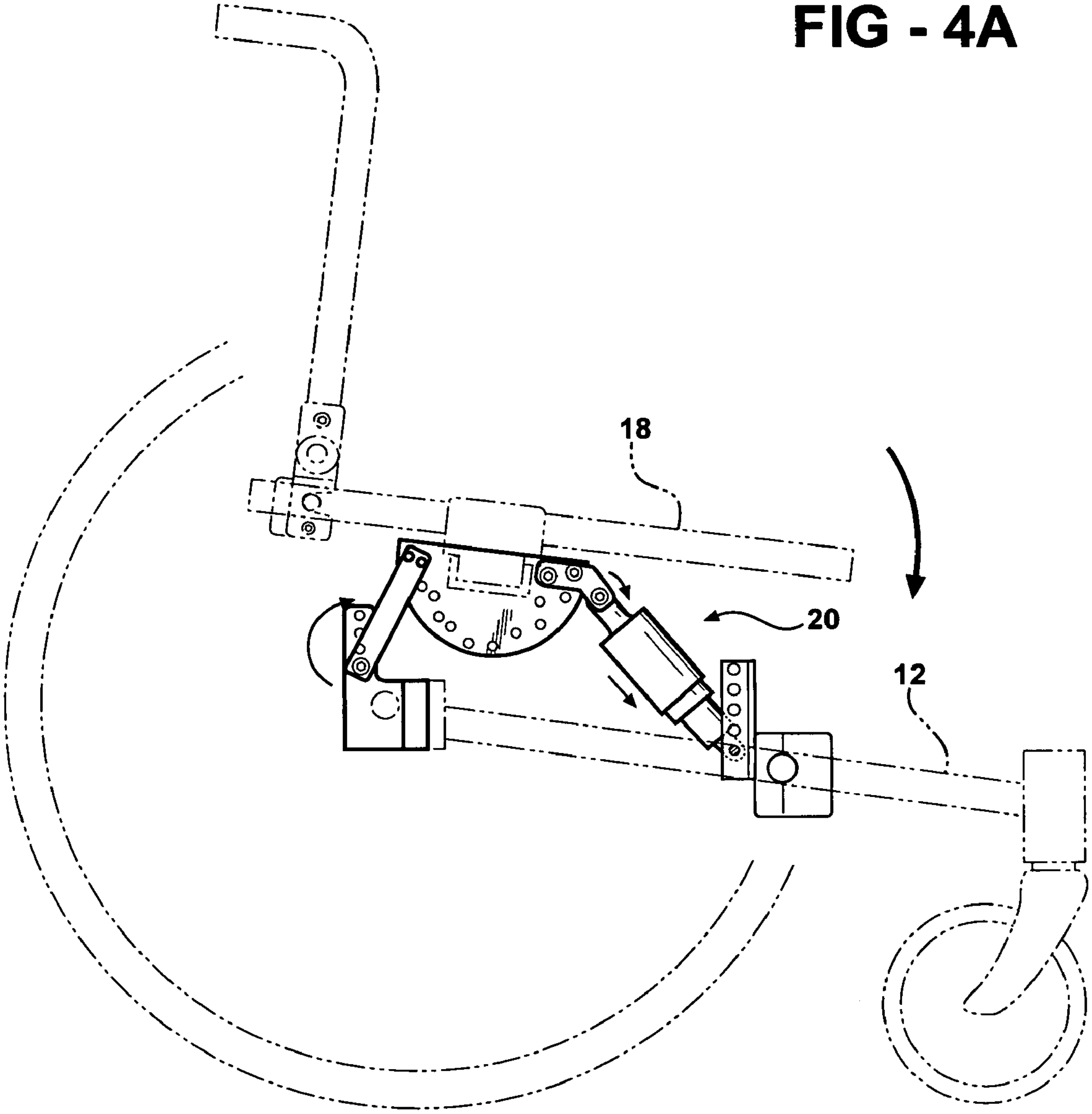
FIG. 4A is similar to FIG. 4, but illustrates the shock-absorbing motion of the seat suspension assembly relative to the frame.

The seat suspension assembly defined by struts 42 and 44 (and connected by monoblock 50) is a trapezoidal, essentially planar structure bisecting the rear portion of frame 12 (FIG. 5) and transferring forces from frame 12 at an angle to the apex of the assembly (monoblock 50) and thus to the seat itself. Front strut 44 is a shock absorbing support, in the illustrated embodiment an air-adjustable monoshock of known type whose damping properties can be adjusted by the wheelchair user. In a preferred form the monoshock is of the type used in mountain bikes, designed to absorb and cushion significant impact forces and vibration. The shock-absorbing front seat support strut 44 works with the extended, downwardly-angled planar frame 12 to absorb significant impacts to the forward portion of the wheelchair frame, and coupled with the pivoting rear strut 42 through monoblock 50 has been found to provide a superior sporting suspension for a wheelchair, with minimal weight and complexity. The preferred angle of front strut 44 for an optimum compression ratio is approximately 45° from horizontal. The angled connection of the monoshock to the nominally horizontal seat assembly results in a desirable pre-loading of the shock absorber, for example on the order of ⅜-inches of "sag". It will be understood that the angle of the monoshock and the amount of pre-loading can be varied according to the user's preferences. FIG. 4A illustrates the shock-absorbing forward motion of suspension 20 (under the weight of an occupied seat) and the following motion and compression of the front and rear struts when the forward end of the wheelchair encounters an impact.

Figure 4B:
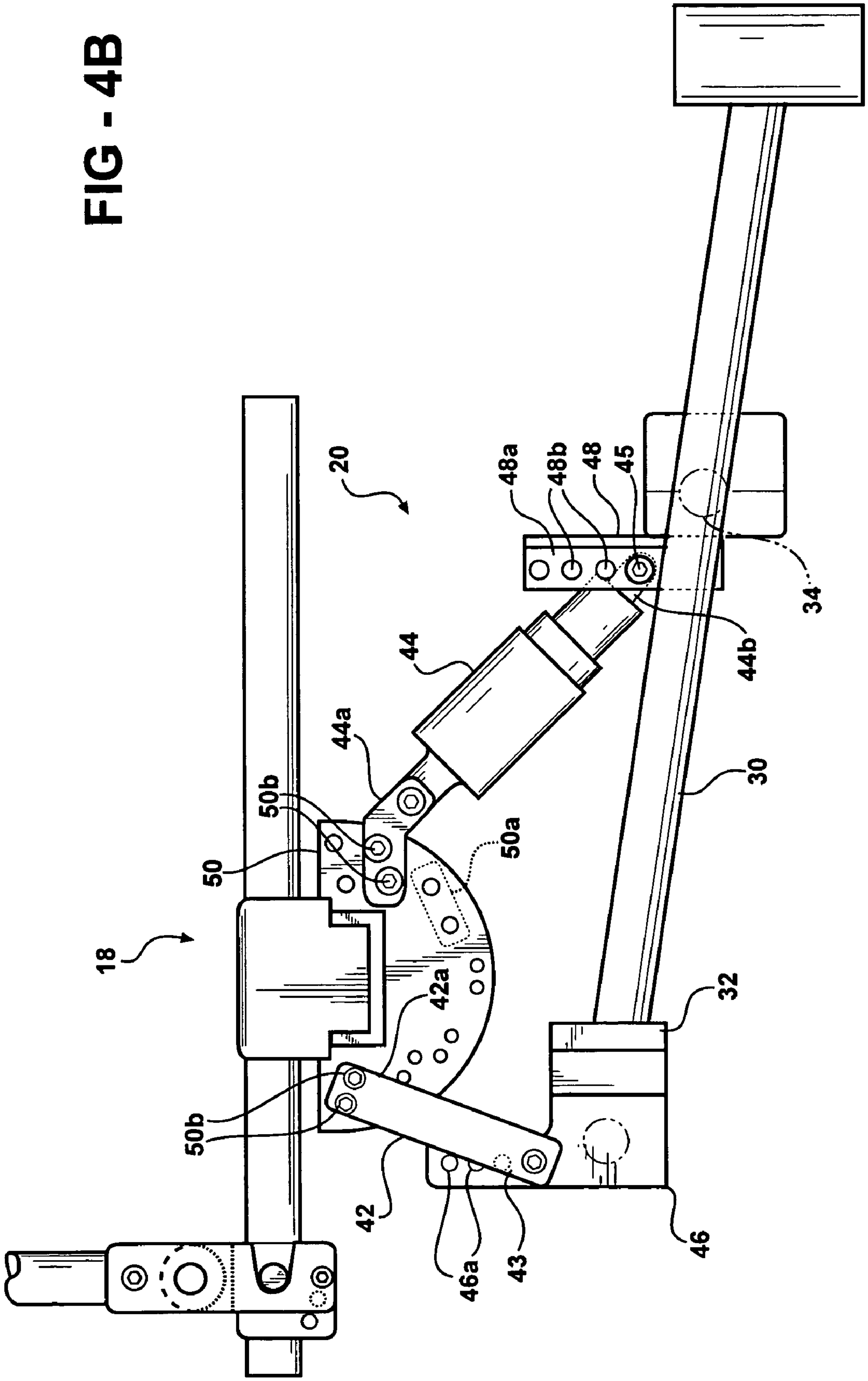
FIG. 4B is a detailed side elevation view of the monoblock portion of the seat support assembly of FIG. 4.

As best shown in FIG. 4B, seat suspension assembly 20 is adjustable both at its lower and upper ends to customize seat height, angle, and response. Either or both of the lower ends of struts 42, 44 can be adjusted vertically up and down along their respective frame mounts 46, 48. Additionally, either or both of the upper ends of the struts can be adjusted in their relative height and horizontal spacing from one another on monoblock 50.

FIG. 5 best illustrates the planar aspect of the two-strut suspension 20 and monoblock 50, bisecting and locating the junction of suspension and seat over the rear portion of frame 12 forward of the main wheel axis.

Figure 6:
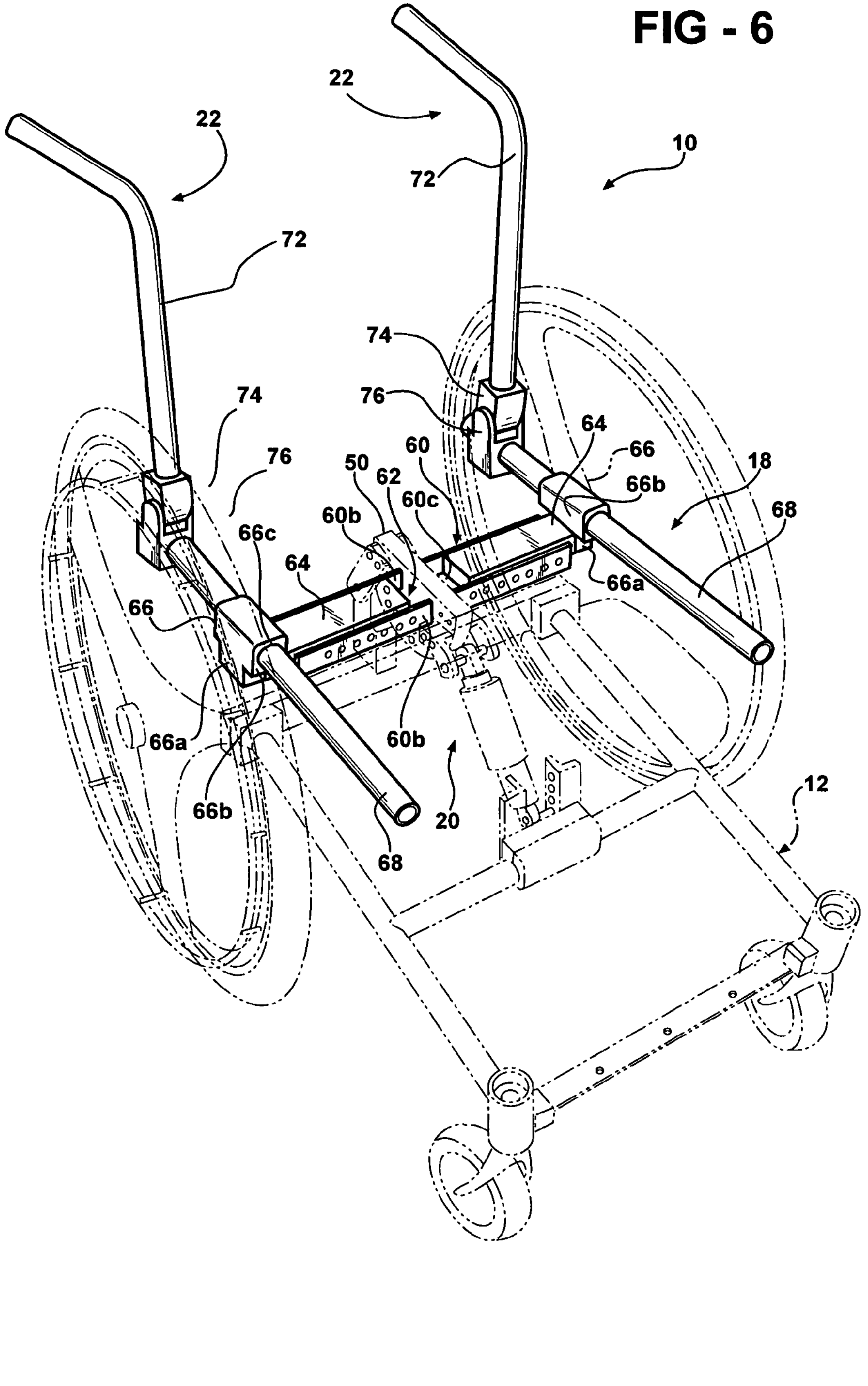
FIG. 6 is a perspective view similar to FIG. 3, but with the seat assembly in solid lines and the remainder in phantom.
Figure 7:
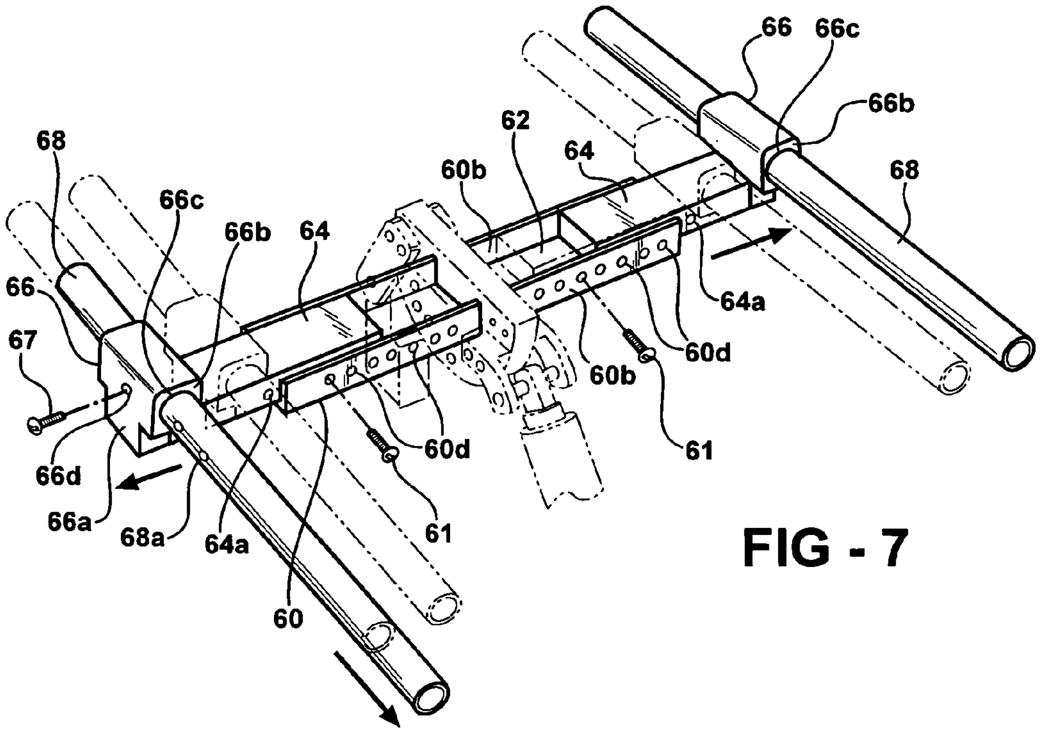
FIG. 7 is a detailed perspective view of the seat assembly of FIG. 6, illustrating seat width and fore-and-aft adjustments.
Figure 8:
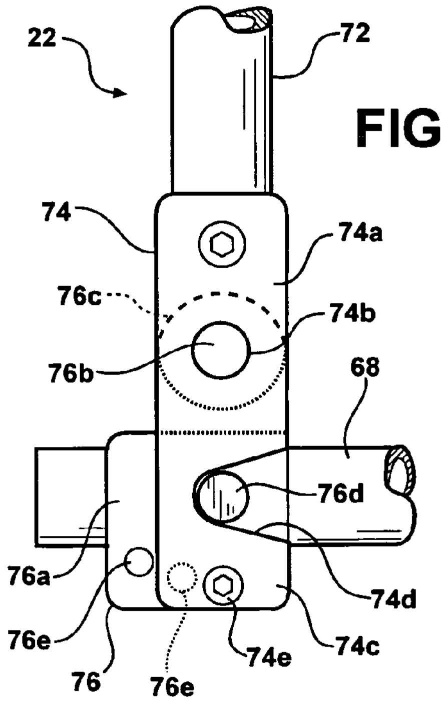
FIG. 8 is a side elevation view of the lower end of one of the backrest supports where it is connected to the seat assembly.

Referring next to FIGS. 6 through 8, a preferred example of seat assembly 18 has a transverse support 60 and two longitudinal seat rails 68 in a generally H-shaped configuration. Seat assembly 18 is supported on and connected to frame 12 through suspension 20, in particular via monoblock 50. Transverse support 60 in the illustrated embodiment is a rigid member machined or cast from a metal such as aluminum or steel, and may be formed from a single piece or from several pieces bolted or welded together. Support 60 has a generally U-shaped configuration, with a channel 62 defined on each side of monoblock 50 between its upstanding sidewalls 60*b* and bottom 60*c*. In the illustrated embodiment, support 60 is secured to monoblock 50 by passing through a correspondingly U-shaped slot in the monoblock. It will be understood by those skilled in the art that transverse support 60 could also be integrally cast with the monoblock, or could be formed in left and right halves and secured to each side of the monoblock with known techniques such as welding or bolting. While it is preferred that the transverse seat support pass through and be centered symmetrically in the interior of monoblock 50, it may be possible to mount support 60 on the monoblock in different ways, for example on top of the monoblock or asymmetrically.

Channels 62 on each side of monoblock 50 slidingly support rail bases 64 attached to rails 68. Rail bases 64 are sized and shaped to slide smoothly in channels 62 without looseness or rattling, supported by the walls and floor of the channels, and to be locked into transverse position with one or more mechanical fasteners. Rails 68 are connected to bases 64 through T-shaped rail blocks 66 whose bases 66*a* fit snugly in the ends of channels 62 and are fixed in place by welding or bolting, and whose arms 66*b* rest on the upper edges of bases 64. Arms 66*b* include passages 66*c* for seat rails 68, sized to allow the seat rails to slide back and forth therein relative to (and preferably above) transverse support 60, and are provided with a mechanical fastener to longitudinally lock the seat rails in desired positions.

FIG. 7 illustrates the transverse adjustment of seat rails 68 to adjust the width of the seat (not shown) mounted on or suspended between the rails. Transverse support 60 includes holes 60*d* located along one or both of sidewalls 60*b* for admitting one or more bolts 61 into engagement with threaded holes 64*a* in rail bases 64. Loosening or removing bolts 61 unlocks each rail base 64, allowing it to slide in channel 60*a* to the desired position with respective holes in the rail base 64 and transverse support 60 aligned. Bolts 61 are then replaced to lock rail bases 64 in their adjusted positions on transverse support 60. In the illustrated embodiment, seat rails 68 are adjustable from a maximum spacing of about 18.0 inches to a minimum of about 13.0 inches, which should be suitable for most users. It will be understood that the seat assembly can be manufactured to have a greater range of adjustment of the spacing of seat rails 68, however.

FIG. 7 also illustrates the fore and aft adjustment of the seat's position through adjustment of seat rails 68 in rail blocks 66. Each seat rail 68 is provided with a line of threaded holes 68*a* in the region engaged by its rail block 66, each hole capable of being aligned with corresponding hole(s) 66*d* in the outer face of rail block 66 to receive locking bolt(s) 67. Loosening or removing bolt 67 allows the seat rail 68 to slide forward or backward in rail block 66, adjusting the position of the actual seat surface relative to the wheelchair as a whole, and thus adjusting the user's center of gravity relative to the wheelchair. Bolt 67 is then replaced or retightened to lock the seat rails in their adjusted position. In the illustrated embodiment, seat rails 68 are provided with enough holes 68*a* spaced sufficiently to allow a range of a few inches of adjustment; although a relatively short range of travel, this has been found sufficient to significantly adjust the user's center of gravity and the balance of the chair. It is possible, however, to provide for a greater range of fore and aft adjustment by increasing the number or spacing of holes 68*a*.

The transverse width adjustments and longitudinal fore-aft adjustments of seat assembly 18 occur in the plane of the seat assembly, leaving tilt adjustments to be effected through adjustments to suspension assembly 20. The seat assembly adjustments are accordingly both simple to make and very secure once locked in place, relying for their strength on the inability of the adjustable members (rail bases 64, seat rails 68) to move relative to their supports (crossbar 60, rail blocks 66) except to slide in a single axis or track which is positively lockable using a mechanical stop such as a bolt. It will be understood by those skilled in the art that the details of the locking mechanisms and the tracks on or in which the movable members are adjusted can vary, although the illustrated examples are preferred.

Like the frame 12 and seat suspension 20, the components of seat assembly 18 are preferably made of a light but strong metal such as the aforementioned aluminum alloy.

Figure 8A:
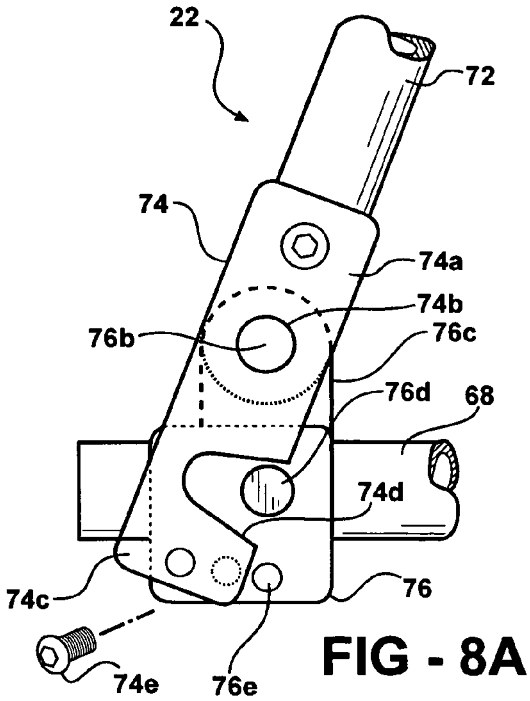
FIG. 8A is similar to FIG. 8, but shows the backrest support in an adjusted position.

Referring to FIGS. 8 and 8A, one of the backrest supports 22 is shown in upright and adjusted positions on its seat rail 68. Backrest supports 22 are attached directly to the rear ends of seat rails 68, in the illustrated embodiments with a preferred pivot adjustment assembly comprising a pivot block 74 secured to the lower end of each tubular rail 72, the pivot block 74 mounted for rotation between multiple lockable positions on a pivot base 76 secured to the rear end of each seat rail 68. Pivot block 74 may be a multi-part structure secured to the end of backrest rail 72, for example in clamping fashion with one or more bolts, or may be a single piece secured to or formed integrally with rail 72. Pivot block 74 includes an upper part 74*a* having a hole or bushing 74*b* for a pivot pin 76*b*, a lower ear 74*c* with a slot 74*d* for engaging a stop 76*d*, and a lower locking member such as a bolt or lockscrew 74*e*. Pivot base 76 has a lower body 76*a* secured to seat rail 68, for example in clamping fashion with one or more bolts or by welding or integral casting with the rail, pivot pin 76*b* in an upper ear 76*c* that rotatably mates with bushing 74*b* and ear 74*c* on pivot block 74, a stop member 76*d* such as a pin or bolt head for engaging the inner end of slot 74*d* on the pivot blocks 74, and multiple adjustment holes 76*e* spaced in an arc in the lower body to receive locking members 74*e* from pivot blocks 74. From their nominal vertical upright position with locking members 74*e* locked into rearwardmost holes 76*d* and the inner end of slots 74*d* abutting stop members 76*d*, each backrest support 22 can be adjusted by loosening its locking member 74*e*, rotating rail 72 forward and down about pivot pin 76*b*, and then locking support 22 in its adjusted position by reengaging locking members 74*e* on pivot blocks 74 with the nearest hole 76*e* in pivot bases 76. Backrest supports 22 can also be folded all the way down against seat rails 68 for storage or transport.

Figure 9:
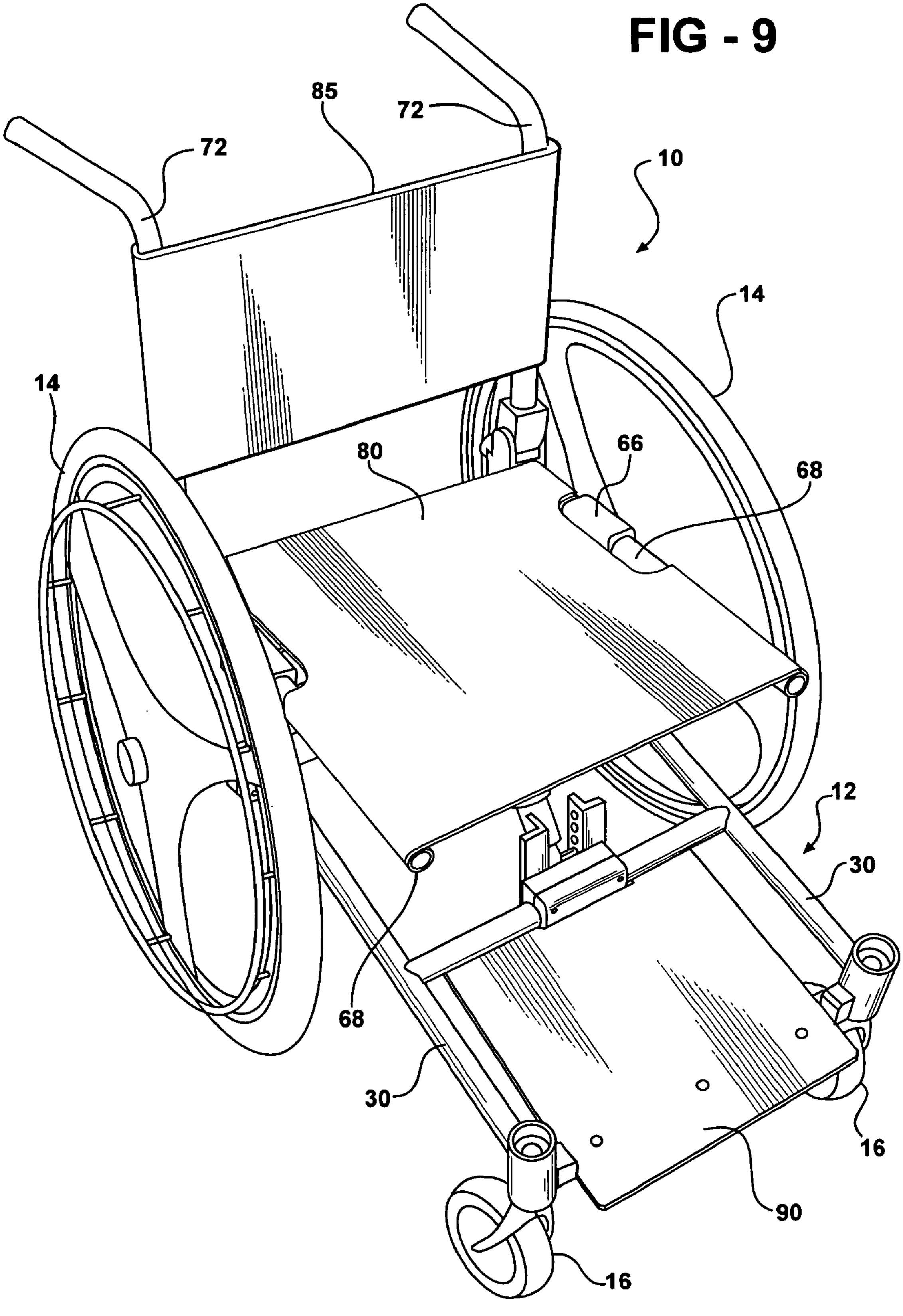
FIG. 9 is a perspective view of the wheelchair similar to FIG. 3, with a transfer plate, backrest, and molded seat added to the wheelchair.

Referring next to FIG. 9, a molded plastic seat 80 has been added to seat rails 68, a fabric backrest has been added to backrest supports 22, and a metal or plastic transfer plate 90 has been added to the forward part of frame 12 between middle cross-bar 34 and forward cross-bar 36. Seat 80 can take any known form or shape, can be molded from plastic or sewn from fabric, and can be removably attached to seat rails 68 by known methods such as a snap- on or slide-on fit in the case of a molded seat, with bolts or screws mating with holes formed in the rails, or with clevis pins, hook-and-loop fastener, ties, sewn tube-receiving pockets, and other fabric fasteners in the case of a fabric seat. Seat 80 may be unpadded, integrally padded, or provided with a supplemental pad. Backrest 85 can likewise be a molded plastic or sewn fabric secured to rails 72 in conventional fashion.

Transfer plate 90 provides a large, low, stable, frame-supported platform forward of the main wheels 14 and rearward of casters 16 for the user's self-assist (or an aide's help in assisting the user) on and off the wheelchair. Transfer plate 90 may be mounted evenly in the plane of frame 12, or may be tilted up or down at one end to provide a preferred angle for transfer, or for bracing of the legs and feet during use of the wheelchair. Transfer plate 90 has a much larger and more stable surface area than the typical footrests common in prior wheelchairs, is strongly supported by frame 12, and additionally allows gear and supplies to be stored and carried securely below and behind the user's legs and feet. If extended sufficiently toward the rear of the wheelchair, the transfer plate can even be used for storage underneath the forward part of the seat. It will be understood that transfer plate 90 can be a removable and/or adjustable plate, or a permanent part of frame 12, and may be molded or machined from suitable metals, plastics, or other materials.

It will be understood that the disclosed embodiments are representative of presently preferred forms of the invention, but are intended to be illustrative rather than definitive of the invention. The scope of the invention is defined by the following claims.

I accordingly claim:

1. A wheelchair for active use, comprising:

a planar frame with main wheels connected to the frame on an axis located at a rear end of the frame, the frame extending forwardly from the main wheel axis to a forward end beyond the main wheels:

a seat suspension located between the rear end of the frame and an intermediate part of the frame, the seat suspension supporting a seat assembly at a point forward of the main wheel axis, the seat suspension comprising a rearwardly-angled front strut connected at its lower end to the intermediate part of the frame, and a forwardly-angled rear strut connected at its lower end to the rear part of the frame, the front strut comprising a shock-absorbing member, wherein the front and rear struts are aligned in a vertical plane perpendicular to the plane of the frame.

2. The wheelchair of claim 1, wherein the front and rear struts are joined at their upper ends by a rigid connecting member spacing the upper ends of the struts a distance less than a spacing of the lower ends of the struts.

3. The wheelchair of claim 2, wherein the lower ends of the struts are vertically adjustable on the frame.

4. The wheelchair of claim 2, wherein the lower ends of the struts are pivotally mounted to the frame.

5. A wheelchair for active use, comprising:

a planar frame with main wheels connected to the frame on an axis located at a rear end of the frame, the frame extending forwardly from the main wheel axis to a forward end beyond the main wheels:

a seat suspension located between the rear end of the frame and an intermediate part of the frame, the seat suspension supporting a seat assembly at a point forward of the main wheel axis, wherein the seat assembly comprises a transverse main support mounted on the suspension, and a pair of longitudinal seat rails mounted for transverse adjustment on the main support.

6. The wheelchair of claim 5, wherein the seat rails are longitudinally adjustable on the main support.

7. The wheelchair of claim 5, wherein the seat assembly includes a pair of upright backrest supports, each backrest support connected to and extending upwardly from a rear end of one of the seat rails.

8. A wheelchair for active use, comprising:

a planar frame with main wheels connected to the frame on an axis located at a rear end of the frame, the frame extending forwardly from the main wheel axis to a forward end beyond the main wheels;

a seat suspension located between the rear end of the frame and an intermediate part of the frame, the seat suspension supporting a seat assembly at a point forward of the main wheel axis, wherein the frame comprises a pair of longitudinal side rails connected by spaced rear, middle, and front cross-members.

9. The wheelchair of claim 8, wherein the frame comprises a transfer plate mounted between the intermediate part of the frame and the forward part of the frame.

10. The wheelchair of claim 9, wherein the transfer plate comprises a platform between the main wheels and front wheels.

11. The wheelchair of claim 9, wherein the transfer plate comprises a platform between the front and middle cross-members.

12. A wheelchair for active use comprising a frame, a seat mounted above the frame, rear main wheels, and a generally trapezoidal seat suspension comprising a rearwardly-angled front strut connected at its lower end to the frame and a rear strut connected at its lower end to the frame, the front strut comprising a shock-absorbing member, the front and rear struts being aligned in a vertical plane relative to the frame, the front and rear struts having upper ends supporting the seat, the upper ends of the front and rear struts being spaced in the vertical plane a distance less than their lower ends.

13. The wheelchair suspension of claim 12, wherein the front and rear struts are joined at their upper ends by a rigid connecting member longitudinally spacing the upper ends of the struts a distance less than a spacing of the lower ends of the struts.

14. The wheelchair of claim 13, wherein the rigid connecting member comprises a planar monoblock defining a plurality of connection points for the upper ends of the front and rear struts.

15. The wheelchair of claim 14, wherein the rigid connecting member comprises a planar, semi-circular monoblock defining an arcuate path of connection points for the upper ends of the front and rear struts.

16. The wheelchair of claim 12, wherein the lower ends of the struts are vertically adjustable on the frame.

17. The wheelchair of claim 16, wherein the lower ends of the struts are pivotally mounted to the frame.

18. A wheelchair for active use comprising a frame, a seat assembly mounted above the frame, rear main wheels, and a seat suspension supporting the seat assembly, the seat assembly comprising a transverse main support mounted on the suspension, and a pair of longitudinal seat rails mounted for transverse adjustment on the main support.

19. The wheelchair of claim 18, wherein the seat rails are longitudinally adjustable on the main support.

20. The wheelchair of claim 18, wherein the seat rails are parallel and free-ended.

* * * * *